(12) United States Patent
St. Myer (10) Patent No.: US 6,964,211 B1
(45) Date of Patent: Nov. 15, 2005

(54) STEERING COLUMN WITH IMPROVED HOUSING

(75) Inventor: Thomas R. St. Myer, Rossville, IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/684,729

(22) Filed: Oct. 6, 2000

(51) Int. Cl.$^7$ ............................................... B62D 1/16
(52) U.S. Cl. ........................ 74/492; 74/493; 280/779; 384/536
(58) Field of Search .................. 74/492, 493; 384/535, 384/536, 581, 582; 280/779

(56) References Cited

U.S. PATENT DOCUMENTS

| | | | |
|---|---|---|---|
| 2,272,900 A | | 2/1942 | Saurer |
| 2,371,534 A | | 3/1945 | McGrath |
| 2,674,505 A | * | 4/1954 | Pfenninger, Jr. et al. .... 384/536 |
| 4,608,881 A | * | 9/1986 | Tanoue ........................ 74/492 |
| 4,981,049 A | | 1/1991 | Venable et al. ............... 74/493 |
| 5,363,716 A | | 11/1994 | Budzik, Jr. et al. |
| 5,632,562 A | * | 5/1997 | Kidzun et al. .............. 384/536 |
| 5,664,806 A | | 9/1997 | Vortmeyer et al. |
| 5,669,718 A | | 9/1997 | Sakairi et al. |
| 5,678,454 A | * | 10/1997 | Cartwright et al. ........... 74/493 |
| 5,722,300 A | | 3/1998 | Burkhard et al. |

FOREIGN PATENT DOCUMENTS

GB           2035471 A  *  6/1980 ............. F16F 1/38

* cited by examiner

Primary Examiner—David A. Bucci
Assistant Examiner—Bradley J. Van Pelt
(74) Attorney, Agent, or Firm—Tarolli, Sundheim, Covell & Tummino L.L.P.

(57) ABSTRACT

A vehicle steering column (10) comprises an axially extending input shaft (12) for connecting to a vehicle steering wheel. The input shaft (12) is rotatable about an axis (A) upon rotation of the steering wheel. The vehicle steering column (10) also comprises a housing (16) at least partially enclosing the input shaft (12). A bearing (92) is interposed between the housing (16) and the input shaft (12) and supports the input shaft (12) for rotation about the axis (A). The housing (16) has at least one series of axially spaced, annular ribs (52) that at least partially extend around the bearing (92). Axially adjacent annular ribs (52) are separated by an annular groove (58). A gasket (100) is interposed between the bearing (92) and the ribs (52). The gasket (100) encircles the bearing (92). The ribs (52) resist axial movement of the gasket (100).

21 Claims, 3 Drawing Sheets

STEERING COLUMN WITH IMPROVED HOUSING

TECHNICAL FIELD

The present invention relates to a vehicle steering column, and more particularly, to the housing supporting the vehicle steering column bearings.

BACKGROUND OF THE INVENTION

A known vehicle steering column has an axially extending input shaft that is connected to the vehicle steering wheel. The input shaft is rotatable about an axis upon rotation of the steering wheel. A housing at least partially encloses the input shaft. A cavity having a flat bottom surface is formed on the inner surface of the housing. A bearing is located in the cavity and is interposed between the input shaft and the housing. The outer race of the bearing seats in the cavity of the housing. The bearing supports the input shaft for rotation about the axis. A gasket is interposed between the housing and the bearing. The gasket is seated against the flat bottom surface of the cavity. The gasket ensures that the bearing fits tightly in the housing. The gasket also eliminates any spacing formed by differences in the manufacturing tolerances of the housing and an outer race of the bearing.

A problem with the known vehicle steering column is that over time, the gasket may "walk out" or move axially out of the cavity and away from its position between the housing and the bearing. When the gasket moves from between the housing and the bearing, the bearing may not fit tightly in the cavity of the housing. As a result, the vehicle steering wheel may begin to feel loose and maintenance to replace the gasket may be required.

Thus, a need exists for a vehicle steering column that is designed to prevent axial movement of the gasket from its position between the housing and the bearing.

SUMMARY OF THE INVENTION

The present invention is a vehicle steering column. The vehicle steering column comprises an axially extending input shaft for connecting to a vehicle steering wheel. The input shaft is rotatable about an axis upon rotation of the steering wheel. The vehicle steering column also comprises a housing at least partially enclosing the input shaft. A bearing is interposed between the housing and the input shaft and supports the input shaft for rotation about the axis. The housing has at least one series of axially spaced, annular ribs that at least partially extend around the bearing. Axially adjacent annular ribs are separated by an annular groove. A gasket is interposed between the bearing and the ribs. The gasket encircles the bearing. The ribs resist axial movement of the gasket.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF PREFERRED EMBODIMENT

The vehicle steering column 10 described hereafter is a tiltable steering column. Those skilled in the art will recognize that the present invention may be utilized on all varieties of vehicle steering columns.

Figure 1:
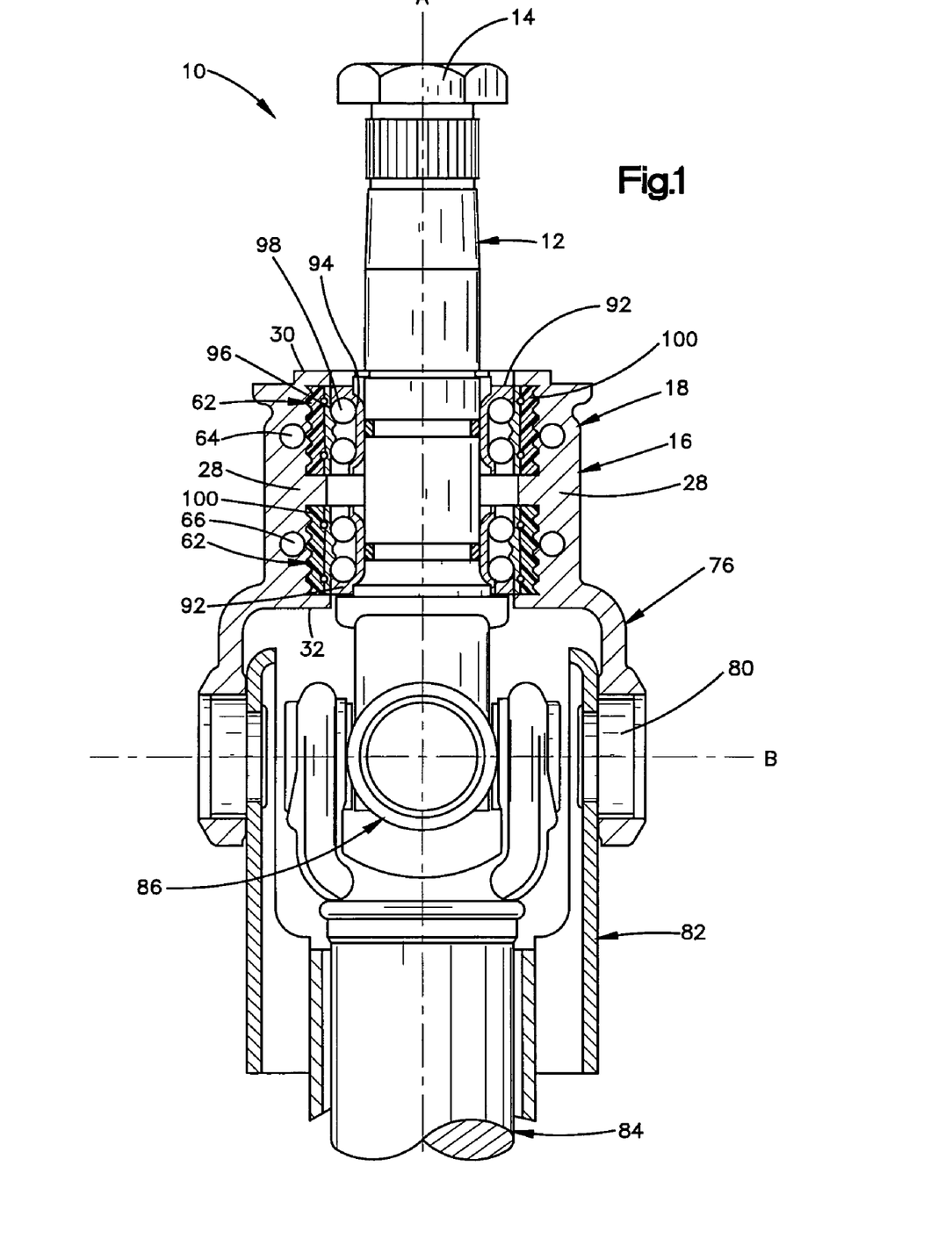
FIG. 1 is a sectional view of the vehicle steering column of the present invention.

FIG. 1 is a sectional view of the vehicle steering column 10 of the present invention. The vehicle steering column 10 includes an axially extending input shaft 12. The steering wheel (not shown) of the vehicle is connected to the input shaft 12 by a nut 14. The input shaft 12 is rotatable about a central axis A that extends axially through the center of the input shaft 12. The input shaft 12 is rotated upon rotation of the steering wheel.

Figure 2:
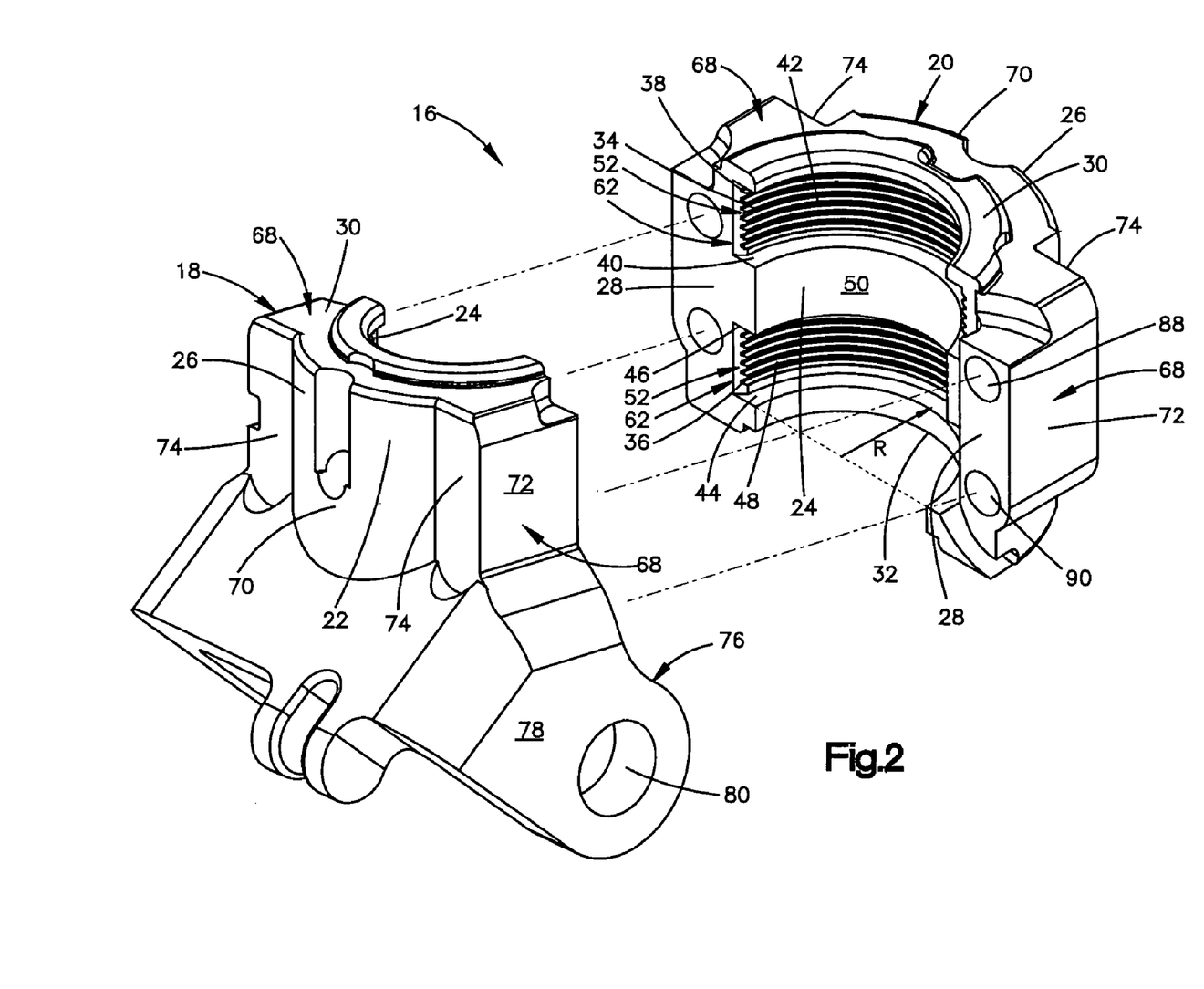
FIG. 2 is a perspective view of the housing of the vehicle steering column in FIG. 1.

The vehicle steering column 10 also includes a housing 16. The housing 16 partially encloses the input shaft 12. In FIG. 1, the housing 16 encloses approximately one-half of the input shaft 12. In FIG. 1, the half of the input shaft 12 that is enclosed by the housing 16 is the lower half of the input shaft 12. The upper half of the input shaft 12 extends axially outwardly of the housing 16. The housing 16 is formed from two parts that are bolted together. As shown in FIG. 2, the two parts include a tilt housing 18 and a bearing cap 20.

Figure 3:
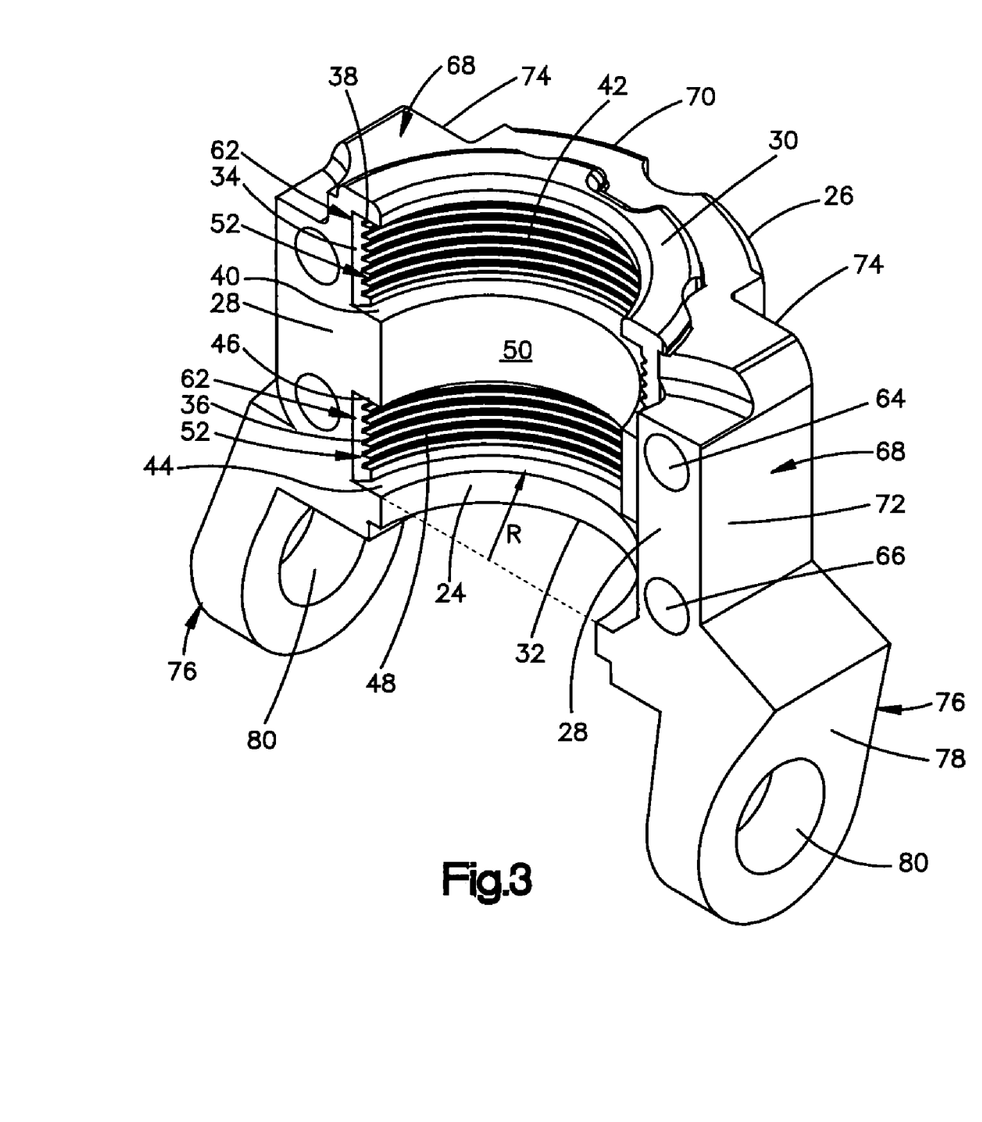
FIG. 3 is a perspective view of the tilt housing of the vehicle steering column in FIG. 1 from the inner surface side of the tilt housing.

As shown in FIGS. 2 and 3, the tilt housing 18 has a main body portion 22 with an inner surface 24, an outer surface 26, two end surfaces 28, an upper surface 30, and a lower surface 32. Both the upper surface 30 and the lower surface 32 are semi-circular and interconnect the inner surface 24 and outer surface 26. The end surfaces 28 extend axially between the upper surface 30 and the lower surface 32 and radially between the inner surface 24 and the outer surface 26. The end surfaces 28 are formed in a common plane.

The inner surface 24 of the tilt housing 18 is concave and forms an open side of both the semi-circular upper surface 30 and the semi-circular lower surface 32 of the tilt housing 18. The inner surface 24 of the tilt housing 18 is smooth and includes at least one cavity 34 or 36. Preferably, the inner surface 24 of the tilt housing 18 includes two cavities 34 and 36, as shown in FIG. 3, that extend radially into the inner surface 24 of the tilt housing 18. Each cavity 34 and 36 begins at one end surface 28 and extends circumferentially across the inner surface 24 of the tilt housing 18 to terminate at the other end surface 28.

A first cavity 34 includes a first radial surface 38, a second radial surface 40, and a bottom surface 42. The first radial surface 38 is located near the upper surface 30 of the tilt housing 18. The first radial surface 38 extends radially outwardly from a central axis A and into the inner surface 24 of the tilt housing 18. The first radial surface 38 extends into the inner surface 24 of the tilt housing 18 an equal distance throughout the circumferential span of the first cavity 34 from one end surface 28 to the other end surface 28. The second radial surface 40 is axially spaced from the first radial surface 38 and is located approximately one-third of the axial length of the tilt housing 18 below the first radial surface 38. The second radial surface 40 extends radially outwardly from a central axis A and into the inner surface 24 of the tilt housing 18 a distance equal to the first radial surface 38. The bottom surface 42 of the first cavity 34 connects the first radial surface 38 to the second radial surface 40 and extends circumferentially from one end surface 28 to the other end surface 28. The bottom surface 42 of the first cavity 34 will be discussed in detail below.

A second cavity 36 is identical in depth and width as the first cavity 34. The second cavity includes a third radial surface 44, a fourth radial surface 46, and a bottom surface 48. The third radial surface 44 is located near the lower surface 32 of the tilt housing 18. The third radial surface 44 extends radially outwardly from the central axis A and into the inner surface 24 of the tilt housing 18. The third radial surface 44 extends into the inner surface 24 of the tilt housing 18 an equal distance throughout the circumferential span of the second cavity 36 from one end surface 28 to the other end surface 28. The fourth radial surface 46 is located approximately one-third of the axial length of the tilt housing 18 above the third radial surface 44. The fourth radial surface 46 extends radially outwardly from a central axis A and into the inner surface 24 of the tilt housing 18 a distance equal to the third radial surface 44. The bottom surface 48 of the second cavity 36 connects the third radial surface 44 to the fourth radial surface 46 and extends circumferentially from one end surface 28 to the other end surface 28. The bottom surface 48 of the second cavity 36 will be discussed in detail below.

A smooth surface 50 extends axially between the second radial surface 40 and the fourth radial surface 46. The smooth surface 50 extends circumferentially from one end surface 28 to the other end surface 28.

Figure 4:
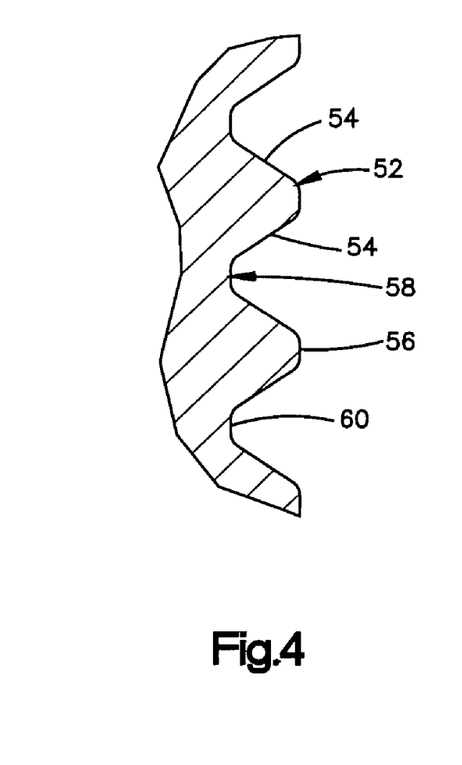
FIG. 4 is a schematic view of a portion of the inner surface of the housing in FIGS. 2 and 3.

As shown in FIGS. 3 and 4, a series of axially spaced ribs 52 extends across the bottom surface 42 and 48 of each cavity 34 and 36 in the tilt housing 18. Each rib 52 has two side surfaces 54, which extend outwardly from the bottom surface 42 or 48 of the respective cavity 34 or 36 and terminate in a peak 56. The peak 56 of each rib 52 extends circumferentially from one end surface 28 to the other end surface 28 and parallels the respective radial surfaces 38 and 40 or 44 and 46 forming the respective cavity 34 or 36. Axially adjacent ribs 52 are separated by a groove 58. The valley 60 of each groove 58 extends parallel to the peak 56 of each rib 52. The valley 60 of each groove 58 forms the bottom surface 42 or 48 of the respective cavity 34 or 36 in the inner surface 24 of the tilt housing 18.

Preferably, the ribs 52 have a uniform width and a uniform height. In the preferred embodiment, the ribs 52 have a width in the range of 0.068 to 0.078 inches and a height in the range of 0.025 inches to 0.035 inches. Also, in the preferred embodiment, the slope of the side surfaces 54 of each rib 52 in relation to the bottom surface 42 or 48 of the respective cavity 34 or 36 is an angle of approximately 57 degrees. Also, the peaks 56 and valleys 60 of each rib 52 and groove 60, respectively, are flat. The axial length of each peak 56 and each valley 60 is in the range of 0.012 inches to 0.022 inches. Preferably, the bottom surface 42 or 48 of each cavity 34 or 36 has five to seven ribs 52.

Each end surface 28 of the tilt housing 18 includes two recesses 62 formed by the cavities 34 and 36 in the inner surface 24 of the tilt housing 18. Each end surface 28 also has a pair of blind holes 64 and 66. The blind holes 64 and 66 are axially spaced from one another and extend into the tilt housing 18 in a direction perpendicular to the respective end surface 28. A first blind hole 64 in each end surface 28 is located adjacent the recess 62 formed by the first cavity 34 in the inner surface 24 of the tilt housing 18. The second blind hole 66 in each end surface 28 is located adjacent the recess 62 formed by the second cavity 36 in the inner surface 24 of the tilt housing 18. The surfaces forming the blind holes 64 and 66 in the tilt housing 18 are threaded to receive bolts.

As shown in FIG. 2, the outer surface 26 of the tilt housing 18 includes two lugs 68 and an arced portion 70. The two lugs 68 extend from the end surfaces 28 of the tilt housing 18 and are connected by the arced portion 70. The outer surface 26 of the tilt housing 18 extends perpendicular to each end surface 28 to form a side surface 72 of each lug 68. Each side surface 72 extends for a distance approximately equal to a radius of curvature R of the inner surface 24 of the tilt housing 18. After extending perpendicular to the end surfaces 28, the outer surface 26 of the tilt housing 18 turns ninety degrees and extends parallel to the end surfaces 28 to form a back surface 74 of each lug 68. The arced surface 70 connects the back surface 74 of each lug 68.

A flange 76 extends outwardly and downwardly from each lug 68 of the tilt housing 18. Each flange 76 has a main body portion 78 that is attached to the side surface 72 of each lug 68. The main body portion 78 of each flange 76 extends toward the open end of the tilt housing 18 at an angle of approximately forty-five degrees to the lower surface 32 of the tilt housing 18. Each flange 76 has a radially extending bore 80 located near the lower end of the flange 76 for receiving a pin (not shown). The center of the bore 80 is located in the same plane as the end surfaces 28 of the tilt housing 18. As shown in FIG. 1, the tilt housing 18 may be attached to a lower housing member 82 through the pin such that the tilt housing 18 can tilt relative to the lower housing member 82. The input shaft 12 is connected to a lower steering column member 84 through a universal joint 86, as is known in the art in a location corresponding to the pin. Thus, the input shaft 12 is tiltable relative to the lower steering column member 84 about axis B. The tilt housing 18 may be locked in a position relative to the lower housing member 82 by any means known in the art.

In addition to the tilt housing 18, the housing 16 also includes the bearing cap 20. The bearing cap 20 is of similar construction to the tilt housing 18 with a few differences. The overall profile of the bearing cap 20, including the inner surface 24 with the two cavities 34 and 36 and the outer surface 26 with the two lugs 68 and the arced portion 70, is identical to that of the tilt housing 18. Parts of the bearing cap 20 that are identical to those in the tilt housing 18 have the same reference numeral. The bearing cap 20 differs from the tilt housing 18 in that no flanges 76 extend from the lugs 68 of the bearing cap 20. Additionally, the holes 88 and 90 that extend into the lugs 68 from the end surfaces 28 of the bearing cap 20 extend completely through the lugs 68 of the bearing cap 20. Thus, the bearing cap 20 has a pair of axially spaced openings (not shown) on the back surface 74 of each lug 68 that are interconnected by holes 88 and 90 to the openings on each end surface 28.

To assemble the housing 16 of the vehicle steering column 10, the end surfaces 28 of the tilt housing 18 are aligned with the end surfaces 28 of the bearing cap 20. When the end surfaces 28 are aligned, the holes 88 and 90 on the bearing cap 20 should align with the holes 64 and 66 on the tilt housing 18. A bolt (not shown) is then inserted into each hole 88 and 90 on the back surface 74 of each lug 68 of the bearing cap 20. The bolts are sufficiently long enough to enter the blind holes 64 and 66 in the tilt housing 18 and are sized to contact the threaded surfaces forming the blind holes 64 and 66. As the bolts are tightened, the bearing cap 20 and the tilt housing 18 become attached to one another to form the assembled housing 16. When the housing 16 is assembled, the axially spaced ribs 52 in each cavity 34 and 36 in the inner surface 24 of bearing cap 20 align with the axially spaced ribs 52 in each cavity 34 and 36 in the inner surface 24 of the tilt housing 18. Thus, in the preferred embodiment, two series of axially spaced, annular ribs 52 are formed in the inner surface 24 of the housing 16, one series in each cavity 34 and 36.

The vehicle steering column 10 also includes a bearing 92. In the preferred embodiment, the vehicle steering column 10 includes the two bearings 92, as shown in FIG. 1. Each bearing 92 is interposed between the housing 16 and the input shaft 12. The bearings 92 support the input shaft 12 for rotation about the central axis A and relative to the housing 16. Preferably, each bearing 92 is a ball bearing, but as those skilled in the art will recognize any type of rotary bearing will work. Each bearing 92 has an inner race 94, an outer race 96, and a plurality of balls 98. The inner race 94 of the bearing 92 attaches to the input shaft 12. The outer race 96 of each bearing 92 is received in a cavity 34 or 36 in the inner surface 24 of the housing 16. The plurality of balls 98 interconnects the inner race 94 and the outer race 96 and provides a means for the inner race 94 to rotate with the input shaft 12 and relative to the outer race 96.

The vehicle steering column 10 of the present invention also includes a cylindrical gasket 100. The gasket 100 is interposed between the outer race 96 of the bearing 92 and the housing 16. The gasket 100 is made from a resilient material, preferably neoprene. In the preferred embodiment of the invention, the gasket 100 has a thickness of approximately 0.031 inches.

To assembly the vehicle steering column 10 of the present invention, the two bearings 92 are attached to the input shaft 12 such that the inner race 94 of each bearing 92 is fixed to the input shaft 12. The inner race 94 of one bearing 92 is located above the inner race 94 of the other bearing 92 a distance equal to the distance between the two cavities 34 and 36 in the inner surface 24 of the housing 16. A gasket 100 is placed around each bearing 92 so that the gasket 100 encircles the outer race 96 of the bearing 92. The bearing cap 20 and the tilt housing 18 are then placed around the bearings 92 so that the outer race 96 of each bearing 92 is supported in a respective cavity 34 or 36 in the inner surfaces 24 of the bearing cap 20 and the tilt housing 18. The housing 16 is assembled in the manner described above. When the housing 16 is assembled, each bearing 92 is seated in a respective cavity 34 or 36 in the inner surface 24 of the housing 16. A gasket 100 is interposed between each bearing 92 and the ribs 52 within the respective cavity 34 or 36. Assembly of the housing 16 causes the gasket 100 to deform across the bottom surface 42 or 48 of each cavity 34 or 36. When the vehicle steering column 10 is assembled, the ribs 52 extending from the bottom surface 42 or 48 of each cavity 34 or 36 press into the resilient material of the gasket 100. As a result, the gasket 100 is deformed and contacts an increased surface area within each cavity 34 or 36 in the inner surface 24 of the housing 16. Thus, the ribs 52 resist axial movement of the gasket 100 and prevent the gasket 100 from moving out of the respective cavity 34 or 36 in the inner surface 24 of the housing 16.

From the above description of the invention, those skilled in the art will perceive improvements, changes and modifications. Such improvements, changes and modifications within the skill of the art are intended to be covered by the appended claims.

Having described the invention, the following is claimed:

1. A vehicle steering column comprising:
an axially extending input shaft for connecting to a vehicle steering wheel, the input shaft being rotatable about an axis upon rotation of the steering wheel;
a housing at least partially enclosing the input shaft;
a bearing interposed between the housing and the input shaft and supporting the input shaft for rotation about the axis, the bearing having an inner race engaging the input shaft and an outer race;
the housing having at least one series of axially spaced, annular ribs that at least partially extend around the axis of the input shaft and around the outer race of the bearing, axially adjacent annular ribs being separated by an annular groove; and
a gasket made of resilient material interposed between the outer race of the bearing and the ribs, the gasket comprising a tubular member encircling the outer race of the bearing, the gasket having a cylindrical inner surface and an outer surface, the inner surface engaging the outer race of the bearing, and the outer surface engaging the ribs, the gasket having portions interdigitated with the ribs to resist relative axial movement between the gasket and the housing,
said axially adjacent annular ribs and said portions of the resilient material of said gasket interdigitated with said axially adjacent annular ribs comprising means for preventing said gasket from walk out from said housing,
each rib in the series of ribs having a uniform width and each rib in the series of ribs having a width in the range of 0.068 inches to 0.078 inches.

2. A vehicle steering column comprising:
an axially extending input shaft for connecting to a vehicle steering wheel, the input shaft being rotatable about an axis upon rotation of the steering wheel;
a housing at least partially enclosing the input shaft;
a bearing interposed between the housing and the input shaft and supporting the input shaft for rotation about the axis, the bearing having an inner race engaging the input shaft and an outer race;
the housing having at least one series of axially spaced, annular ribs that at least partially extend around the axis of the input shaft and around the outer race of the bearing, axially adjacent annular ribs being separated by an annular groove; and
a gasket made of resilient material interposed between the outer race of the bearing and the ribs, the gasket comprising a tubular member encircling the outer race of the bearing, the gasket having a cylindrical inner surface and an outer surface, the inner surface engaging the outer race of the bearing, and the outer surface engaging the ribs, the gasket having portions interdigitated with the ribs to resist relative axial movement between the gasket and the housing,
said axially adjacent annular ribs and said portions of the resilient material of said gasket interdigitated with said axially adjacent annular ribs comprising means for preventing said gasket from walk out from said housing,
each rib in the series of ribs having a uniform height, each rib in the series of ribs having a height in the range of 0.025 inches to 0.035 inches.

3. A vehicle steering column comprising:
an axially extending input shaft for connecting to a vehicle steering wheel, the input shaft being rotatable about an axis upon rotation of the steering wheel;
a housing at least partially enclosing the input shaft;
a bearing interposed between the housing and the input shaft and supporting the input shaft for rotation about the axis, the bearing having an inner race engaging the input shaft and an outer race;
the housing having at least one series of axially spaced, annular ribs that at least partially extend around the axis of the input shaft and around the outer race of the bearing, axially adjacent annular ribs being separated by an annular groove; and a gasket made of resilient material interposed between the outer race of the bearing and the ribs, the gasket comprising a tubular member encircling the outer race of the bearing, the gasket having a cylindrical inner surface and an outer surface, the inner surface engaging the outer race of the bearing, and the outer surface engaging the ribs, the gasket having portions interdigitated with the ribs to resist relative axial movement between the gasket and the housing, said axially adjacent annular ribs and said portions of the resilient material of said gasket interdigitated with said axially adjacent annular ribs comprising means for preventing said gasket from walk out from said housing, each rib having a peak, each peak being flat and having an axial length in the range of 0.012 to 0.022 inches.

4. A vehicle steering column comprising:

an axially extending input shaft for connecting to a vehicle steering wheel, the input shaft being rotatable about an axis upon rotation of the steering wheel;

a housing at least partially enclosing the input shaft;

a bearing interposed between the housing and the input shaft and supporting the input shaft for rotation about the axis, the bearing having an inner race engaging the input shaft and an outer race;

the housing having at least one series of axially spaced, annular ribs that at least partially extend around the axis of the input shaft and around the outer race of the bearing, axially adjacent annular ribs being separated by an annular groove; and a gasket made of resilient material interposed between the outer race of the bearing and the ribs, the gasket comprising a tubular member encircling the outer race of the bearing, the gasket having a cylindrical inner surface and an outer surface, the inner surface engaging the outer race of the bearing, and the outer surface engaging the ribs, the gasket having portions interdigitated with the ribs to resist relative axial movement between the gasket and the housing, said axially adjacent annular ribs and said portions of the resilient material of said gasket interdigitated with said axially adjacent annular ribs comprising means for preventing said gasket from walk out from said housing, each annular groove having a valley, the valley being flat and forming a bottom surface of a cavity, the valley having an axial length in the range of 0.012 to 0.022 inches.

5. A vehicle steering column comprising:

an axially extending input shaft for connecting to a vehicle steering wheel, the input shaft being rotatable about an axis upon rotation of the steering wheel;

a housing at least partially enclosing the input shaft;

a bearing interposed between the housing and the input shaft and supporting the input shaft for rotation about the axis, the bearing having an inner race engaging the input shaft and an outer race;

the housing having at least one series of axially spaced, annular ribs that at least partially extend around the axis of the input shaft and around the outer race of the bearing, axially adjacent annular ribs being separated by an annular groove; and a gasket made of resilient material interposed between the outer race of the bearing and the ribs, the gasket comprising a tubular member encircling the outer race of the bearing, the gasket having a cylindrical inner surface and an outer surface, the inner surface engaging the outer race of the bearing, and the outer surface engaging the ribs, the gasket having portions interdigitated with the ribs to resist relative axial movement between the gasket and the housing, said axially adjacent annular ribs and said portions of the resilient material of said gasket interdigitated with said axially adjacent annular ribs comprising means for preventing said gasket from walk out from said housing, each rib of the series of ribs having side surfaces that extend from the bottom surface at an angle of approximately 57 degrees.

6. A vehicle steering column comprising:

an axially extending steering input shaft for connecting to a vehicle steering wheel, the input shaft being rotatable about an axis upon rotation of the steering wheel;

a housing having a cylindrical portion at least partially enclosing the input shaft and having inner and outer surfaces and first and second axially spaced apart ring shaped cavities that extend radially into the inner surface of the cylindrical portion of the housing, the first and second ring shaped cavities being spaced apart by a ring shaped projection of said cylindrical portion of the housing;

first and second bearings interposed between the housing and the input shaft in the first and second cavities, respectively, and supporting the input shaft for rotation about the axis, each of the first and second bearings having an inner race engaging the input shaft and an outer race;

each of the first and second cavities having a series of annular ribs that at least partially extend around the axis of the input shaft and around the outer race of the bearing in the respective first and second cavities, axially adjacent annular ribs being separated by an annular groove; and first and second gaskets made of resilient material in each of the first and second cavities and interposed between the outer race of the bearing and the ribs, each of the first and second gaskets comprising a tubular member encircling the outer race of the bearing, the resilient material of each of the gaskets having a cylindrical inner surface and an outer surface, the cylindrical inner surface of the resilient material of each gasket engaging the outer race of the bearing, and the outer surface of the resilient material of each gasket engaging the ribs, the resilient material of each gasket having portions interdigitated with the ribs of each of the first and second cavities to resist relative axial movement between the resilient material of each respective gasket and the housing, said axially adjacent annular ribs and said portions of the resilient material of each gasket interdigitated with said axially adjacent annular ribs comprising means for preventing said first and second gaskets from walk out from said first and second cavities, each rib in the series of ribs having a uniform width, each rib in the series of ribs having a width in the range of 0.068 inches to 0.078 inches.

7. A vehicle steering column comprising:

an axially extending steering input shaft for connecting to a vehicle steering wheel, the input shaft being rotatable about an axis upon rotation of the steering wheel;

a housing having a cylindrical portion at least partially enclosing the input shaft and having inner and outer surfaces and first and second axially spaced apart ring shaped cavities that extend radially into the inner surface of the cylindrical portion of the housing, the first and second ring shaped cavities being spaced apart by a ring shaped projection of said cylindrical portion of the housing;

first and second bearings interposed between the housing and the input shaft in the first and second cavities, respectively, and supporting the input shaft for rotation about the axis, each of the first and second bearings having an inner race engaging the input shaft and an outer race;

each of the first and second cavities having a series of annular ribs that at least partially extend around the axis of the input shaft and around the outer race of the bearing in the respective first and second cavities, axially adjacent annular ribs being separated by an annular groove; and first and second gaskets made of resilient material in each of the first and second cavities and interposed between the outer race of the bearing and the ribs, each of the first and second gaskets comprising a tubular member encircling the outer race of the bearing, the resilient material of each of the gaskets having a cylindrical inner surface and an outer surface, the cylindrical inner surface of the resilient material of each gasket engaging the outer race of the bearing, and the outer surface of the resilient material of each gasket engaging the ribs, the resilient material of each gasket having portions interdigitated with the ribs of each of the first and second cavities to resist relative axial movement between the resilient material of each respective gasket and the housing, said axially adjacent annular ribs and said portions of the resilient material of each gasket interdigitated with said axially adjacent annular ribs comprising means for preventing said first and second gaskets from walk out from said first and second cavities, each rib in the series of ribs having a uniform height, each rib in the series of ribs having a height in the range of 0.025 inches to 0.035 inches.

8. A vehicle steering column comprising:

an axially extending steering input shaft for connecting to a vehicle steering wheel, the input shaft being rotatable about an axis upon rotation of the steering wheel;

a housing having a cylindrical portion at least partially enclosing the input shaft and having inner and outer surfaces and first and second axially spaced apart ring shaped cavities that extend radially into the inner surface of the cylindrical portion of the housing, the first and second ring shaped cavities being spaced apart by a ring shaped projection of said cylindrical portion of the housing;

first and second bearings interposed between the housing and the input shaft in the first and second cavities, respectively, and supporting the input shaft for rotation about the axis, each of the first and second bearings having an inner race engaging the input shaft and an outer race;

each of the first and second cavities having a series of annular ribs that at least partially extend around the axis of the input shaft and around the outer race of the bearing in the respective first and second cavities, axially adjacent annular ribs being separated by an annular groove; and first and second gaskets made of resilient material in each of the first and second cavities and interposed between the outer race of the bearing and the ribs, each of the first and second gaskets comprising a tubular member encircling the outer race of the bearing, the resilient material of each of the gaskets having a cylindrical inner surface and an outer surface, the cylindrical inner surface of the resilient material of each gasket engaging the outer race of the bearing, and the outer surface of the resilient material of each gasket engaging the ribs, the resilient material of each gasket having portions interdigitated with the ribs of each of the first and second cavities to resist relative axial movement between the resilient material of each respective gasket and the housing, said axially adjacent annular ribs and said portions of the resilient material of each gasket interdigitated with said axially adjacent annular ribs comprising means for preventing said first and second gaskets from walk out from said first and second cavities, each rib having a peak, each peak being flat and having an axial length in the range of 0.012 to 0.022 inches.

9. A vehicle steering column comprising:

an axially extending steering input shaft for connecting to a vehicle steering wheel, the input shaft being rotatable about an axis upon rotation of the steering wheel;

a housing having a cylindrical portion at least partially enclosing the input shaft and having inner and outer surfaces and first and second axially spaced apart ring shaped cavities that extend radially into the inner surface of the cylindrical portion of the housing, the first and second ring shaped cavities being spaced apart by a ring shaped projection of said cylindrical portion of the housing;

first and second bearings interposed between the housing and the input shaft in the first and second cavities, respectively, and supporting the input shaft for rotation about the axis, each of the first and second bearings having an inner race engaging the input shaft and an outer race;

each of the first and second cavities having a series of annular ribs that at least partially extend around the axis of the input shaft and around the outer race of the bearing in the respective first and second cavities, axially adjacent annular ribs being separated by an annular groove; and first and second gaskets made of resilient material in each of the first and second cavities and interposed between the outer race of the bearing and the ribs, each of the first and second gaskets comprising a tubular member encircling the outer race of the bearing, the resilient material of each of the gaskets having a cylindrical inner surface and an outer surface, the cylindrical inner surface of the resilient material of each gasket engaging the outer race of the bearing, and the outer surface of the resilient material of each gasket engaging the ribs, the resilient material of each gasket having portions interdigitated with the ribs of each of the first and second cavities to resist relative axial movement between the resilient material of each respective gasket and the housing, said axially adjacent annular ribs and said portions of the resilient material of each gasket interdigitated with said axially adjacent annular ribs comprising means for preventing said first and second gaskets from walk out from said first and second cavities, each annular groove having a valley, the valley being flat and forming a bottom surface of a cavity, the valley having an axial length in the range of 0.012 to 0.022 inches.

10. A vehicle steering column comprising:
an axially extending steering input shaft for connecting to a vehicle steering wheel, the input shaft being rotatable about an axis upon rotation of the steering wheel;
a housing having a cylindrical portion at least partially enclosing the input shaft and having inner and outer surfaces and first and second axially spaced apart ring shaped cavities that extend radially into the inner surface of the cylindrical portion of the housing, the first and second ring shaped cavities being spaced apart by a ring shaped projection of said cylindrical portion of the housing;
first and second bearings interposed between the housing and the input shaft in the first and second cavities, respectively, and supporting the input shaft for rotation about the axis, each of the first and second bearings having an inner race engaging the input shaft and an outer race;
each of the first and second cavities having a series of annular ribs that at least partially extend around the axis of the input shaft and around the outer race of the bearing in the respective first and second cavities, axially adjacent annular ribs being separated by an annular groove; and
first and second gaskets made of resilient material in each of the first and second cavities and interposed between the outer race of the bearing and the ribs, each of the first and second gaskets comprising a tubular member encircling the outer race of the bearing, the resilient material of each of the gaskets having a cylindrical inner surface and an outer surface, the cylindrical inner surface of the resilient material of each gasket engaging the outer race of the bearing, and the outer surface of the resilient material of each gasket engaging the ribs, the resilient material of each gasket having portions interdigitated with the ribs of each of the first and second cavities to resist relative axial movement between the resilient material of each respective gasket and the housing,
said axially adjacent annular ribs and said portions of the resilient material of each gasket interdigitated with said axially adjacent annular ribs comprising means for preventing said first and second gaskets from walk out from said first and second cavities,
each rib of the series of ribs having side surfaces that extend from the bottom surface at an angle of approximately 57 degrees.

11. A vehicle steering column comprising:
an axially extending steering input shaft for connecting to a vehicle steering wheel, the input shaft being rotatable about an axis upon rotation of the steering wheel;
a housing having a cylindrical portion at least partially enclosing the input shaft and having inner and outer surfaces and first and second axially spaced apart ring shaped cavities that extend radially into the inner surface of the cylindrical portion of the housing, the first and second ring shaped cavities being spaced apart by a ring shaped projection of said cylindrical portion of the housing;
first and second bearings interposed between the housing and the input shaft in the first and second cavities, respectively, and supporting the input shaft for rotation about the axis, each of the first and second bearings having an inner race engaging the input shaft and an outer race;
each of the first and second cavities having a series of annular ribs that at least partially extend around the axis of the input shaft and around the outer race of the bearing in the respective first and second cavities, axially adjacent annular ribs being separated by an annular groove; and
first and second gaskets made of resilient material in each of the first and second cavities and interposed between the outer race of the bearing and the ribs, each of the first and second gaskets comprising a tubular member encircling the outer race of the bearing, the resilient material of each of the gaskets having a cylindrical inner surface and an outer surface, the cylindrical inner surface of the resilient material of each gasket engaging the outer race of the bearing, and the outer surface of the resilient material of each gasket engaging the ribs, the resilient material of each gasket having portions interdigitated with the ribs of each of the first and second cavities to resist relative axial movement between the resilient material of each respective gasket and the housing,
said axially adjacent annular ribs and said portions of the resilient material of each gasket interdigitated with said axially adjacent annular ribs comprising means for preventing said first and second gaskets from walk out from said first and second cavities,
each rib in the series of ribs has a width and a height, the width being in the range of 0.068 inches to 0.078 inches, the height being in the range of 0.025 inches to 0.035 inches, each rib having a flat peak with an axial length in the range of 0.012 inches to 0.022 inches;
each annular groove having a flat valley with an axial length in the range of 0.012 inches to 0.022 inches; and
each rib of the series of ribs having side surfaces that extend from the bottom surface at an angle of approximately 57 degrees.

12. A vehicle steering column comprising:
an axially extending input shaft for connecting to a vehicle steering wheel, the input shaft being rotatable about an axis upon rotation of the steering wheel;
a housing at least partially enclosing the input shaft;
a bearing interposed between the housing and the input shaft and supporting the input shaft for rotation about the axis, the bearing having an inner race engaging the input shaft and an outer race;
the housing having at least one series of axially spaced, annular ribs that at least partially extend around the axis of the input shaft and around the outer race of the bearing, axially adjacent annular ribs being separated by an annular groove; and
a gasket made of resilient material interposed between the outer race of the bearing and the ribs, the gasket comprising a tubular member encircling the outer race of the bearing, the gasket having a cylindrical inner surface and an outer surface, the inner surface engaging the outer race of the bearing, and the outer surface engaging the ribs, the gasket having portions interdigitated with the ribs to resist relative axial movement between the gasket and the housing,
said axially adjacent annular ribs and said portions of the resilient material of said gasket interdigitated with said axially adjacent annular ribs comprising means for preventing said gasket from walk out from said housing, each rib in the series of ribs has a width and a height, the width being in the range of 0.068 inches to 0.078 inches, the height being in the range of 0.025 inches to 0.035 inches, each rib having a flat peak with an axial length in the range of 0.012 inches to 0.022 inches;

each annular groove having a flat valley with an axial length in the range of 0.012 inches to 0.022 inches; and each rib of the series of ribs having side surfaces that extend from the bottom surface at an angle of approximately 57 degrees.

13. A vehicle steering column comprising:

an axially extending input shaft for connecting to a vehicle steering wheel, the input shaft being rotatable about an axis upon rotation of the steering wheel;

a housing at least partially encircling the input shaft, said housing includes first and second housing parts which are assembled together to form first and second axially spaced apart chambers which extend around said input shaft and have ribbed bottom surfaces, said first and second housing parts have a first annular radially extending surface which at least partially defines a first end of said first chamber and a second annular radially extending surface which at least partially defines a second end of said first chamber, said first and second housing parts have a third annular radially extending surface which at least partially defines a first end of said second chamber and a fourth annular radially extending surface which at least partially defines a second end of said second chamber, a first bearing assembly having an inner race connected with said input shaft, an outer race seated in said first chamber in engagement with said first and second housing parts, and a plurality of rotatable bearing elements disposed between said inner and outer races of said first bearing assembly, said outer race of said first bearing assembly has a first annular end surface which is disposed in engagement with said first annular radially extending surface on said first and second housing parts, said outer race of said first bearing assembly has a second annular end surface which is disposed in engagement with said second radially extending surface on said first and second housing parts, a second bearing assembly having an inner race connected with said input shaft at a location axially spaced from said first bearing assembly, said second bearing assembly having an outer race seated in said second chamber in engagement with said first and second housing parts, and a plurality of bearing elements disposed between said inner and outer races of said second bearing assembly, said outer race of said second bearing assembly has a first annular end surface which is disposed in engagement with said third annular radially extending surface on said first and second housing parts, said outer race of said second bearing assembly has a second annular end surface which is disposed in engagement with said fourth radially extending surface on said first and second housing parts, a first gasket disposed in said first chamber between said outer race of said first bearing assembly and said ribbed bottom surface of said first chamber, said first gasket being disposed in engagement with said first and second housing parts, and a second gasket disposed in said second chamber between said outer race of said second bearing assembly and said ribbed bottom surface of said second chamber, said second gasket being disposed in engagement with said first and second housing parts, said second gasket being axially spaced from said first gasket.

14. The vehicle steering column of claim 13 wherein said first gasket has a first annular end surface which is disposed in engagement with said first annular radially extending surface on said first and second housing parts, said first gasket has a second annular end surface which is disposed in engagement with said second radially extending surface on said first and second housing parts, said second gasket has a first annular end surface which is disposed in engagement with said third annular radially extending surface on said first and second housing parts, said second gasket has a second annular end surface which is disposed in engagement with said fourth radially extending surface on said first and second housing parts.

15. The vehicle steering column of claim 14 wherein said first gasket has a cylindrical side surface which extends between said first and second annular radially extending surfaces on said first and second housing parts and is disposed in engagement with a cylindrical side surface on said outer race of said first bearing assembly, said second gasket has a cylindrical side surface which extends between said third and fourth annular radially extending surfaces on said first and second housing parts and is disposed in engagement with a cylindrical side surface on said outer race of said second bearing assembly.

16. A vehicle steering column comprising:

an axially extending input shaft for connecting to a vehicle steering wheel, the input shaft being rotatable about an axis upon rotation of the steering wheel;

a housing which extends around the input shaft, said housing includes an annular chamber which has a bottom with a plurality of annular ribs which extend around said input shaft and have parallel circular crests, the crest on each rib is spaced from the crest on an adjacent rib, a bearing assembly having an inner race connected with said input shaft, an outer race seated in said chamber in said housing, said outer race having a first annular end which is disposed in engagement with a first radially extending surface on said housing and a second annular end which is disposed in engagement with a second radially extending surface on said housing to enable said outer race to block an entrance to said chamber, and a plurality of rotatable bearing elements disposed between said inner and outer races of said bearing assembly, and a gasket which is entirely disposed in said chamber between said outer race of said bearing assembly and said bottom of said chamber, said gasket extends into spaces between said annular ribs to retain said gasket against axial movement relative to said housing.

17. The vehicle steering column of claim 16 wherein said housing includes a second annular chamber which has a bottom with a second plurality of annular ribs which extend around said input shaft and have parallel circular crests, the crest on each rib is spaced from the crest on an adjacent rib, a second bearing assembly having an inner race connected with said input shaft, said second bearing assembly having an outer race seated in said second chamber in said housing, said outer race of said second bearing assembly having a first annular end which is disposed in engagement with a third radially extending surface on said housing and a fourth annular end which is disposed in engagement with a fourth radially extending surface on said housing to enable said outer race of said second bearing assembly to block an entrance to said second chamber, said second bearing assembly having a plurality of rotatable bearing elements disposed between said inner and outer races of said second bearing assembly, a second gasket which is entirely disposed in said second chamber between said outer race of said second bearing assembly and said bottom of said second chamber, said second gasket extends into spaces between said second annular ribs to retains aid second gasket against axial movement relative to said housing.

18. The vehicle steering column of claim 16 wherein said gasket has annular ribs which are formed by engagement with the annular ribs on the bottom of said chamber.

19. The vehicle steering column of claim 16 wherein said housing includes first and second housing parts which are assembled together to form said chamber.

20. A vehicle steering column comprising:
- an axially extending input shaft for connecting to a vehicle steering wheel, the input shaft being rotatable about an axis upon rotation of the steering wheel;
- a housing at least partially encircling the input shaft, said housing includes first and second housing parts which are assembled together to form first and second axially spaced apart chambers which extend around said input shaft and have ribbed bottom surfaces, said first and second housing parts at least partially define a cylindrical surface which extends from an axial end portion of said first chamber to an axial end portion of said second chamber,
- a first bearing assembly having an inner race connected with said input shaft, an outer race seated in said first chamber in engagement with said first and second housing parts, and a plurality of rotatable bearing elements disposed between said inner and outer races of said first bearing assembly,
- a second bearing assembly having an inner race connected with said input shaft at a location axially spaced from said first bearing assembly, said second bearing assembly having an outer race seated in said second chamber in engagement with said first and second housing parts, and a plurality of bearing elements disposed between said inner and outer races of said second bearing assembly,
- a first gasket disposed in said first chamber between said outer race of said first bearing assembly and said ribbed bottom surface of said first chamber, said first gasket being disposed in engagement with said first and second housing parts, and
- a second gasket disposed in said second chamber between said outer race of said second bearing assembly and said ribbed bottom surface of said second chamber, said second gasket being disposed in engagement with said first and second housing parts, said second gasket being axially spaced from said first gasket, said first and second gaskets being spaced from said cylindrical surface.

21. A vehicle steering column comprising:
- an axially extending input shaft for connecting to a vehicle steering wheel, the input shaft being rotatable about an axis upon rotation of the steering wheel;
- a housing at least partially encircling the input shaft, said housing includes first and second housing parts which are assembled together to form first and second axially spaced apart chambers which extend around said input shaft and have ribbed bottom surfaces,
- a first bearing assembly having an inner race connected with said input shaft, an outer race seated in said first chamber in engagement with said first and second housing parts, and a plurality of rotatable bearing elements disposed between said inner and outer races of said first bearing assembly,
- a second bearing assembly having an inner race connected with said input shaft at a location axially spaced from said first bearing assembly, said second bearing assembly having an outer race seated in said second chamber in engagement with said first and second housing parts, and a plurality of bearing elements disposed between said inner and outer races of said second bearing assembly,
- a first gasket disposed in said first chamber between said outer race of said first bearing assembly and said ribbed bottom surface of said first chamber, said first gasket being disposed in engagement with said first and second housing parts, said first gasket has a plurality of annular ribs with parallel circular crests, the crest of each rib on said first gasket is spaced from the crest of an adjacent rib on said first gasket, and
- a second gasket disposed in said second chamber between said outer race of said second bearing assembly and said ribbed bottom surface of said second chamber, said second gasket being disposed in engagement with said first and second housing parts, said second gasket being axially spaced from said first gasket, said second gasket has a plurality of annular ribs with parallel circular crests, the crest of each rib on said second gasket is spaced from the crest of an adjacent rib on said second gasket.

* * * * *

UNITED STATES PATENT AND TRADEMARK OFFICE
CERTIFICATE OF CORRECTION

PATENT NO. : 6,964,211 B1
DATED : November 15, 2005
INVENTOR(S) : Thomas R. St. Myer It is certified that error appears in the above-identified patent and that said Letters Patent is hereby corrected as shown below:

Column 15,
Line 7, after "to" change "retains aid" to -- retain said --.

Signed and Sealed this

Fourteenth Day of March, 2006

JON W. DUDAS
*Director of the United States Patent and Trademark Office*